United States Patent
Larsen et al.

(10) Patent No.: US 9,829,117 B2
(45) Date of Patent: Nov. 28, 2017

(54) APPARATUS AND METHOD FOR POSITIONING UNDERWATER PIPE

(71) Applicants: Jan Larsen, Nicosia (CY); Chen-Shan Kung, Taipei (TW); Yuan-Jui Lu, Taipei (TW)

(72) Inventors: Jan Larsen, Nicosia (CY); Chen-Shan Kung, Taipei (TW); Yuan-Jui Lu, Taipei (TW)

( * ) Notice: Subject to any disclaimer, the term of this patent is extended or adjusted under 35 U.S.C. 154(b) by 0 days.

(21) Appl. No.: 15/182,425

(22) Filed: Jun. 14, 2016

(65) Prior Publication Data

US 2016/0377197 A1 Dec. 29, 2016

(30) Foreign Application Priority Data

Jun. 24, 2015 (TW) .............................. 104120331 A (51) Int. Cl.
*F16L 1/235* (2006.01)
*F16L 1/24* (2006.01)
*F16L 1/16* (2006.01)

(52) U.S. Cl.
CPC .............. *F16L 1/235* (2013.01); *F16L 1/163* (2013.01); *F16L 1/165* (2013.01); *F16L 1/24* (2013.01)

(58) Field of Classification Search
CPC ... F16L 1/235; F16L 1/24; F16L 1/265; F16L 1/165; F16L 1/163; F16L 1/12; F16L 3/26
USPC .... 405/154.1, 158, 161, 162, 164, 171, 174, 405/175, 184.4, 200, 205; 441/133, 134
See application file for complete search history.

(56) References Cited

U.S. PATENT DOCUMENTS

| | | | | |
|---|---|---|---|---|
| 3,566,609 A | * | 3/1971 | Smith | B63B 35/03 405/167 |
| 4,107,802 A | * | 8/1978 | Patinet | F16L 1/24 248/62 |
| 4,107,933 A | * | 8/1978 | Lamy | F16L 1/14 405/171 |
| 4,121,529 A | * | 10/1978 | Smith | F16L 1/163 114/267 |
| 4,127,007 A | * | 11/1978 | Mathieu | E02D 15/08 405/171 |
| 4,191,494 A | * | 3/1980 | Nakamura | F16L 1/165 137/116.5 |
| 4,974,995 A | * | 12/1990 | Ayers | F16L 1/163 405/162 |
| 6,290,432 B1 | * | 9/2001 | Exley | B08B 9/023 137/317 |
| 2006/0088383 A1 | * | 4/2006 | Sestito | F16L 1/24 405/158 |
| 2007/0059104 A1 | * | 3/2007 | Clausen | F16L 1/161 405/171 |

(Continued)

*Primary Examiner* — Carib Oquendo
(74) *Attorney, Agent, or Firm* — Michael Best & Friedrich LLP (57) ABSTRACT

An apparatus for positioning an underwater pipe includes a plurality of fixing members for disposing on an outer circumferential surface of the underwater pipe in a spaced apart manner, a submersible unit connected to one of the fixing members, and a counterweight unit. The submersible unit is configured to float the underwater pipe on a water surface and submerge the underwater pipe. The counterweight unit is connected to the other one of the fixing members when the underwater pipe is submerged for positioning the underwater pipe on a bottom of a body of water.

5 Claims, 5 Drawing Sheets (56) References Cited

U.S. PATENT DOCUMENTS

| | | | |
|---|---|---|---|
| 2008/0095583 A1* | 4/2008 | Giovannini | F16L 1/163 405/171 |
| 2010/0166501 A1* | 7/2010 | Cocca | F16L 1/165 405/171 |
| 2012/0114420 A1* | 5/2012 | Lazzarin | E02F 5/006 405/171 |

* cited by examiner

APPARATUS AND METHOD FOR POSITIONING UNDERWATER PIPE

CROSS-REFERENCE TO RELATED APPLICATION

This application claims priority to Taiwanese Application No. 104120331, filed on Jun. 24, 2015.

FIELD

The disclosure relates to an apparatus, and more particularly to an apparatus and a method for positioning an underwater pipe.

BACKGROUND

An underwater pipe for pumping seawater is relatively large in size. Therefore, it may be difficult to drag the underwater pipe to a predetermined distance from a shore. Further, after dragging the underwater pipe to the predetermined distance from the shore, the underwater pipe must be submerged and positioned to a bottom of a body of water so as to avoid shaking along with the water currents which may cause damage to the underwater pipe.

Although the underwater pipe maybe tied with buoyant tubes to facilitate its dragging, the connection of the buoyant tubes with the underwater pipe is unstable, thereby causing unsmooth dragging operation of the underwater pipe.

In addition, while a plurality of counterweight members may be provided to submerge the underwater pipe, if the counterweight members are not properly secured to the underwater pipe, the positioning of the underwater pipe to the bottom of the body of water may be adversely affected.

SUMMARY

Therefore, an object of the disclosure is to provide an apparatus for positioning an underwater pipe that can alleviate at least one drawback of the prior art.

Another object of the disclosure is to provide a method for positioning an underwater pipe.

According to one aspect of the disclosure, an apparatus for positioning an underwater pipe having an outer circumferential surface includes a plurality of fixing members, a submersible unit, and a counterweight unit.

The fixing members are configured to be disposed on the outer circumferential surface of the underwater pipe in a spaced apart manner along the length of the underwater pipe.

The submersible unit includes a positioning frame detachably mounted on one of the fixing members, and a plurality of tank members fixed to the positioning frame. Each of the tank members has a tank body defining a receiving space, and a water inlet valve and an air outlet valve both operably mounted on the tank body.

The counterweight unit includes at least one counterweight member and at least one connecting bar connected to the counterweight member.

The receiving spaces of the tank members are empty prior to operation of the water inlet valves and the air outlet valves of the tank members so that the tank members have a buoyancy for floating the underwater pipe on a water surface, and are filled with water when the water inlet valves and the air outlet valves of the tank members are operated for submerging the underwater pipe.

The connecting bar is connected to the other one of the fixing members when the underwater pipe is submerged for positioning the underwater pipe on a bottom of a body of water.

According to another aspect of the disclosure, a method for positioning an underwater pipe includes the steps of:

(A) preparing a plurality of fixing members, a submersible unit and a counterweight unit, the submersible unit including a positioning frame and a plurality of tank members fixed to the positioning frame, each of the tank members having a tank body defining a receiving space, a water inlet valve and an air outlet valve both operably mounted on the tank body, the counterweight unit including at least one counterweight member and at least one connecting bar connected to the at least one counterweight member;

(B) disposing the fixing members on an outer circumferential surface of the underwater pipe in a spaced apart manner along the length of the underwater pipe and mounting the positioning frame on one of the fixing members;

(C) emptying the receiving space of each of the tank members to float the underwater pipe on a water surface and then dragging the underwater pipe to a predetermined distance from the shore;

(D) operating the water inlet valve and the air outlet valve of each of the tank members for water to fill the receiving space of each of the tank members for submerging the underwater pipe; and (E) securing the connecting bar of the counterweight member to the other one of the fixing members.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that like elements are denoted by the same reference numerals throughout the disclosure.

Referring to FIGS. 1 to 4, a first embodiment of an apparatus for positioning a large-diameter underwater pipe 10 according to the disclosure is shown to include a plurality of fixing members 12, a submersible unit 20 and a counterweight unit 30.

The underwater pipe 10 extends along a longitudinal axis (L) and has an outer circumferential surface 11. In this embodiment, three fixing members 12 are exemplified. The fixing members 12 are disposed on the outer circumferential surface 11 of the underwater pipe 10 in a spaced apart manner along the length of the underwater pipe 10. Each of the fixing members 12 is a ring sleeved on the outer circumferential surface 11 and having a U-shaped cross section perpendicular to the longitudinal axis (L). Each fixing member 12 has an annular bight portion 121 abutting against the outer circumferential surface 11, and two annular flanges 122 extending respectively and transversely from two opposite ends of the annular bight portion 121 away from the outer circumferential surface 11. The annular flanges 122 of each fixing member 12 have a plurality of aligned fixing holes 124. In this embodiment, each fixing member 12 has a closed-loop configuration, and the fixing holes 124 of each annular flange 122 are arranged in groups of three. Alternatively, each fixing member 12 may include a one-piece C-shaped clamp and a screw to close an opening between two opposite ends of the C-shaped clamp. In some embodiments, each fixing member 12 may be made with a multiple-piece clamp, i.e., each fixing member 12 has a plurality of arc plates surrounding the outer circumferential surface 11, and a plurality of screws each connecting two opposite ends of a corresponding arc plate.

Figure 2:
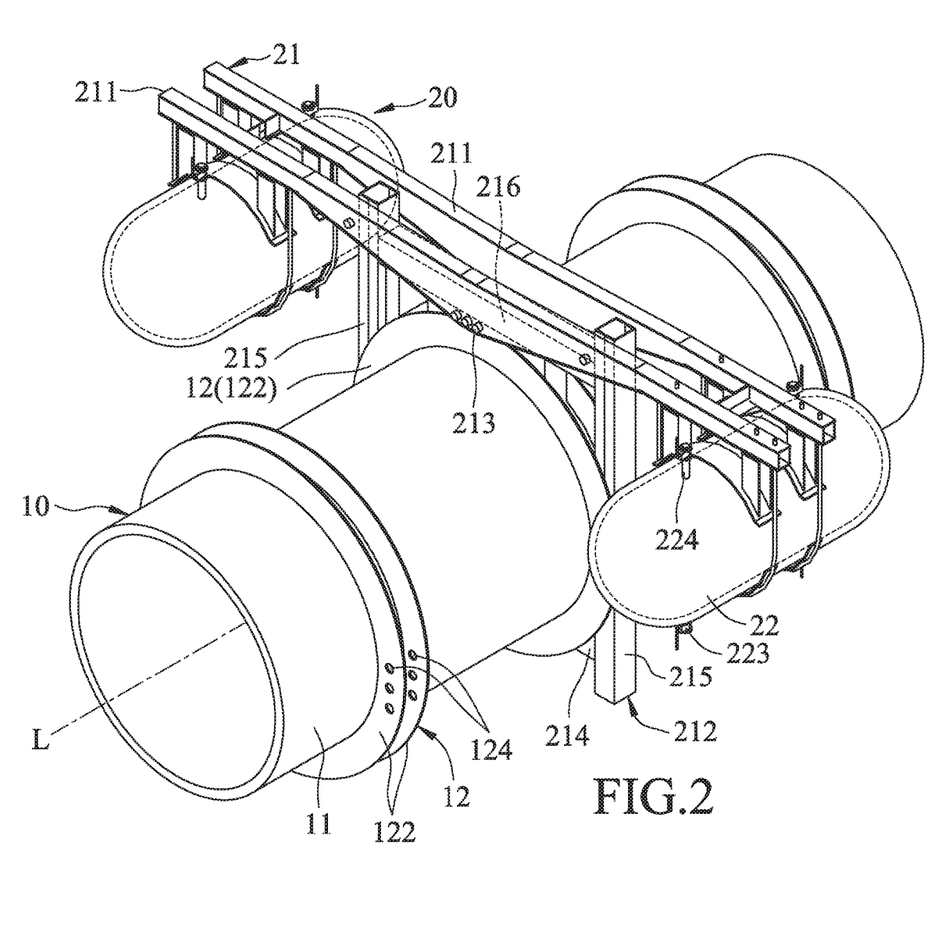
FIG. 2 is a perspective view, illustrating a submersible unit of the first embodiment connected to an underwater pipe.
Figure 3:
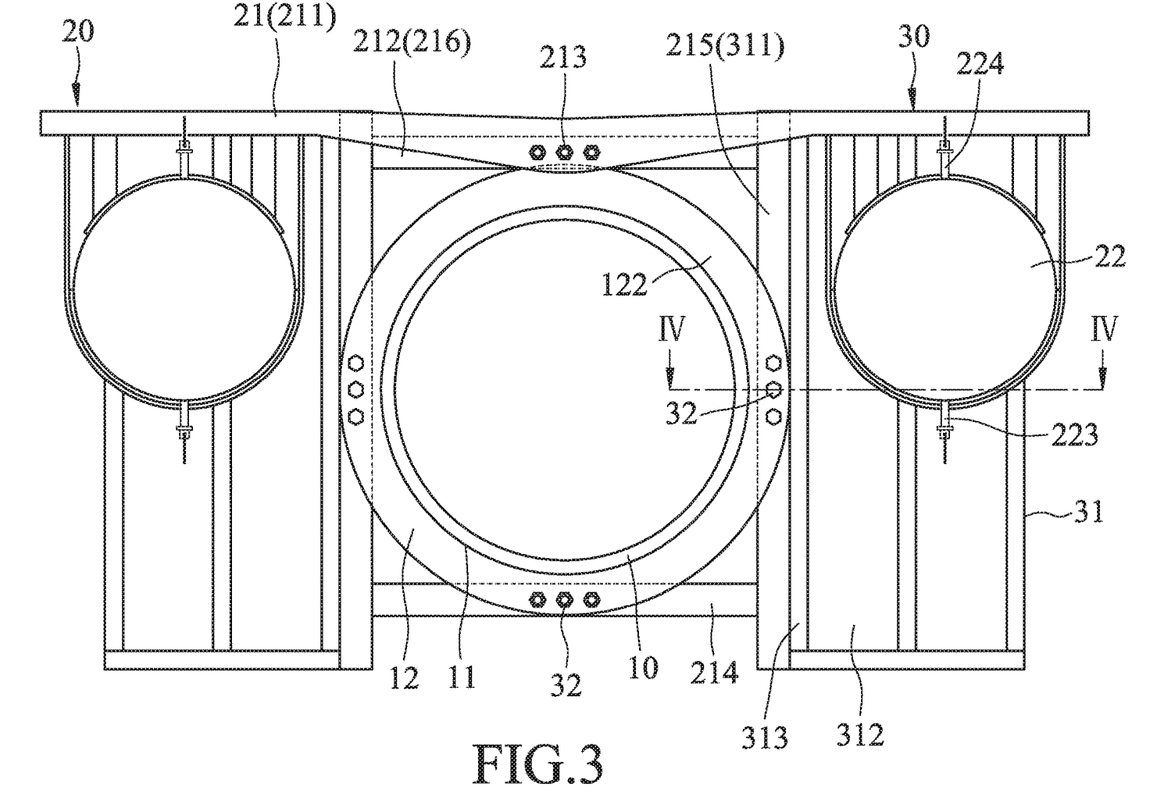
FIG. 3 is a schematic view of the first embodiment.
Figure 4:
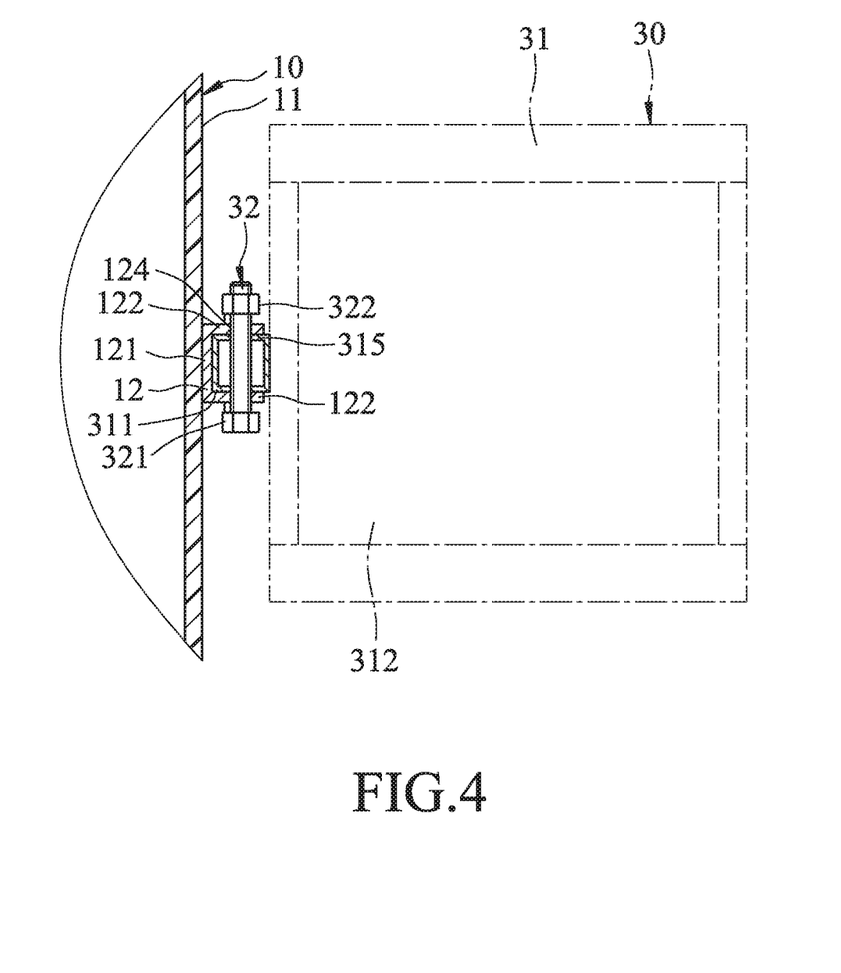
FIG. 4 is a sectional view of the first embodiment taken along line IV-IV of FIG. 3.

The submersible unit 20 includes a positioning frame 21 detachably mounted on a middle one of the fixing members 12, and a plurality of tank members 22 fixed to the positioning frame 21. In this embodiment, two tank members 22 are fixed to the positioning frame 21 and are located on two opposite sides of the underwater pipe 10. The positioning frame 21 has two elongated positioning bars 211 and a pipe support 212. The positioning bars 211 extend transversely to the longitudinal axis (L), are spaced apart from each other along the longitudinal axis (L), and correspond in position to the annular flanges 122 of the middle fixing member 12. The pipe support 212 has a rectangular configuration, and includes two spaced-apart lateral rods 215 respectively disposed on two opposite sides of the middle fixing member 12, a bottom rod 214 disposed on a bottom side of the middle fixing member 12 and interconnecting the lateral rods 215, and a top rod 216 disposed on a top side of the middle fixing member 12 and detachably interconnecting the lateral rods 215. Specifically, the positioning bars 211 are respectively screwed to two opposite sides of the top rod 216 by a plurality of screws 213 such that the top rod 216 is disposed between the positioning bars 211. Further, each lateral rod 215 is fixed between the annular flanges 122 of the middle fixing member 12 at one side thereof by extending three fasteners 32 through three aligned fixing holes 124 in the annular flanges 122 of the middle fixing member 12 and the corresponding lateral rod 215, and the bottom rod 214 is fixed between the annular flanges 122 of the middle fixing member 12 at the bottom side thereof by extending another three fasteners 32 through another three aligned fixing holes 124 in the annular flanges 122 of the middle fixing member 12 and the bottom rod 214, as best shown in FIGS. 2 and 3. Each of the tank members 22 has a tank body 222 defining a receiving space 221 and connected to one ends of the positioning bars 211, and a water inlet valve 223 and an air outlet valve 224 both operably mounted on the tank body 222.

Figure 1:
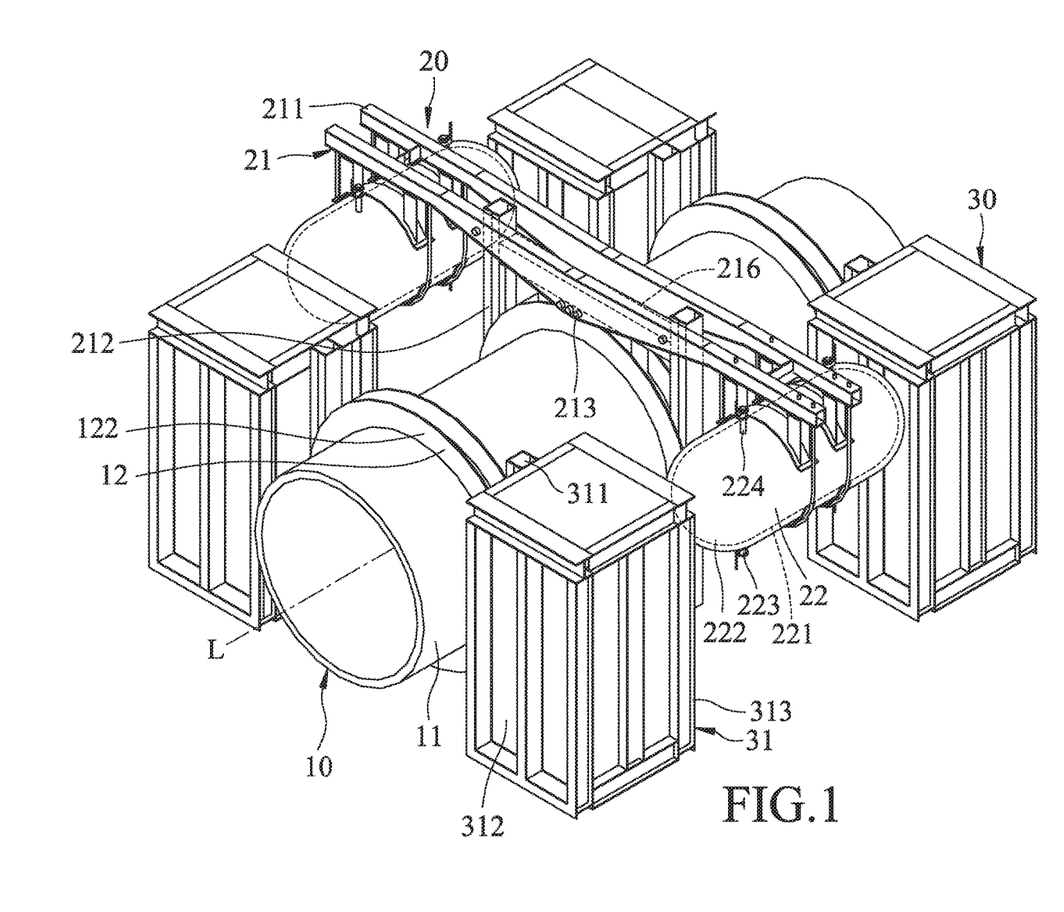
FIG. 1 is a perspective view of a first embodiment of an apparatus for positioning an underwater pipe according to the disclosure.

In this embodiment, the counterweight unit 30 includes four counterweight members 31, four connecting bars 311 respectively connected to the counterweight members 31, and a plurality of fasteners 32. Two of the counterweight members 31 are disposed on the opposite sides of the underwater pipe 10 at a position corresponding to a front one of the fixing members 12, while the other two counterweight members 31 are disposed on the opposite sides of the underwater pipe 10 at a position corresponding to a rear one of the fixing members 12. Each counterweight member 31 has a counterweight body 312, and a counterweight frame 313 receiving the counterweight body 312 and connected to the respective connecting bar 311. Each connecting bar 311 has a polygonal cross section, and is formed with a plurality of aligned through holes 315. In this embodiment, each connecting bar 311 has a square cross section. Each fastener 32 includes a bolt 321 and nut 322. The bolt 321 extends through one of the fixing holes 124 in one of the annular flanges 122 of a corresponding front or rear fixing member 12, through a corresponding one of the aligned through holes 315 in the corresponding connecting bar 311, and out of the fixing hole 124 in the other annular flange 122 of the corresponding front or rear fixing member 12 to connect with the nut 322, thereby fixing the connecting bar 311 between the annular flanges 122 of the corresponding front or rear fixing member 12.

With reference to FIG. 2, the pipe support 212 is first secured to the annular flanges 122 of the middle fixing member 12, after which the positioning bars 211 are screwed to the top rod 216 by the screws 213 so as to position the positioning frame 21 to the underwater pipe 10. Since the receiving spaces 221 of the tank members 22 are empty prior to operation of the water inlet valves 223 and the air outlet valves 224 of the tank members 22, the tank members 22 have a buoyancy for floating the underwater pipe 10 on a water surface to facilitate dragging of the underwater pipe 10 to a predetermined distance from the shore.

Afterwards, the water inlet valves 223 and the air outlet valves 224 of the tank members 22 are operated to fill the receiving spaces 221 of the tank members 22 with water for submerging the underwater pipe 10. The counterweight members 31 are then secured one by one to the annular flanges 122 of the corresponding fixing members 12 by using the fasteners 32, thereby positioning the underwater pipe 10 on a bottom of a body of water (e.g., seabed, riverbed, etc.).

The advantages of the underwater pipe assembly of the disclosure can be summarized as follows:

1. Since the tank members 22 can float and provide buoyancy when empty and can submerge when filled with water, the tank members 22 can achieve dual purpose. It is worth to mention herein that the submersible unit 20 can be detached from the corresponding fixing member 12 and the underwater pipe 10 for reuse. Because the submersible unit 20 can be detached and thus can be repeatedly use, the cost of the underwater pipe assembly of the disclosure can be minimized.

2. Because of the connection of the fixing members 12 and the counterweight unit 30, the underwater pipe 10 can be positioned stably to the bottom of the body of water and protected by the counterweight unit 30 so that damage of the underwater pipe 10 caused by water currents and pressures can be avoided.

Figure 5:
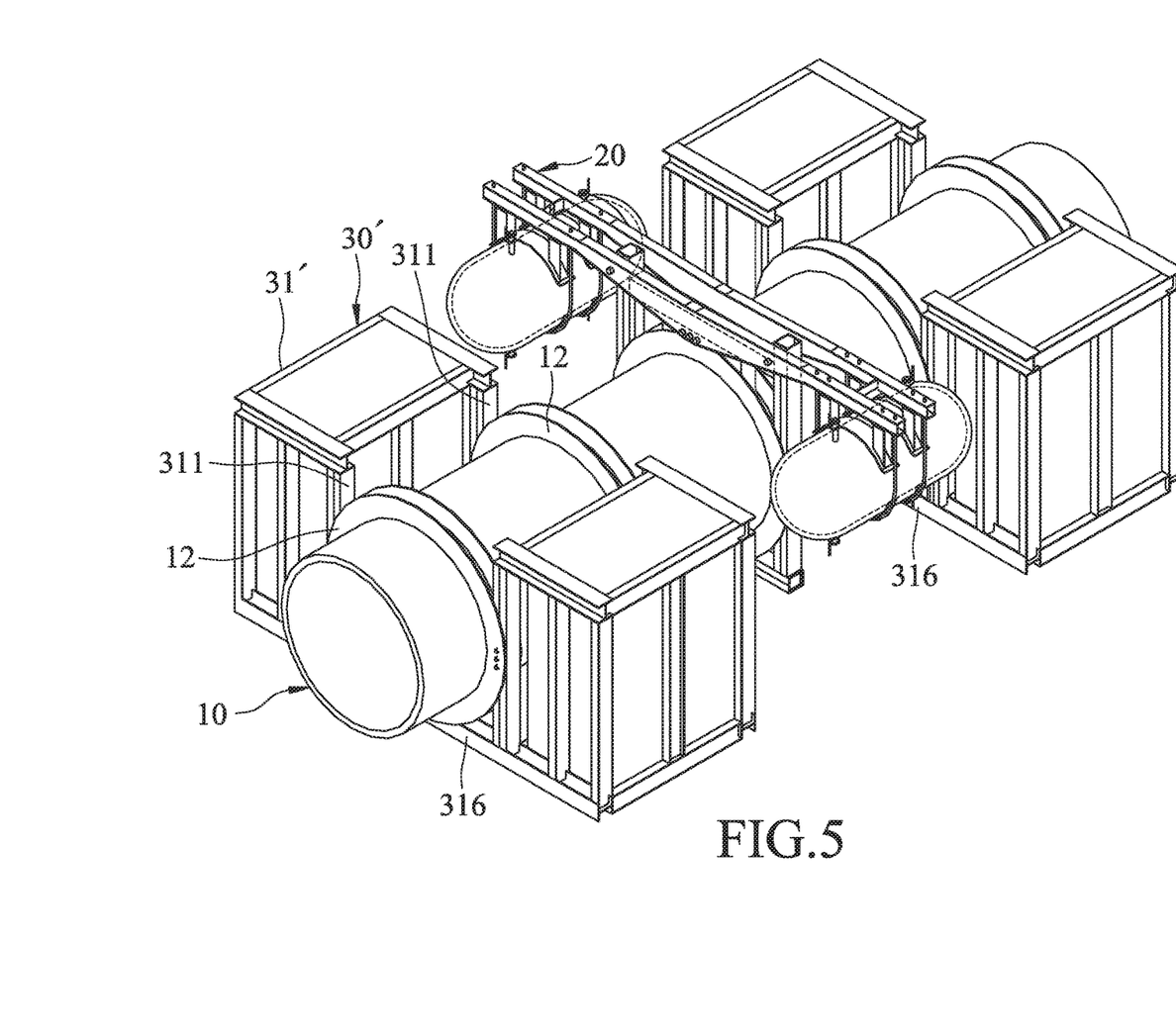
FIG. 5 is a perspective view of a second embodiment of an apparatus for positioning an underwater pipe according to the disclosure.

FIG. 5 illustrates a second embodiment of an apparatus for positioning a large-diameter underwater pipe 10 according to the disclosure. The second embodiment has a structure generally similar to that of the first embodiment. However, in the second embodiment, five fixing members 12 are exemplified, and each of the counterweight members 31' is connected with two connecting bars 311 that are disposed on a same side thereof for simultaneous connection with two of the fixing members 12 that are proximate to each other. The counterweight unit 30' further includes four cross bars 316 each two of which interconnect two counterweight members 31 that are disposed on the two opposite sides of the underwater pipe 10. Specifically, each cross bar 316 extends in the direction transverse to the longitudinal axis (L) and is connected between one of the connecting bars 311 of one of the counterweight members 31 that is disposed on one side of the underwater pipe 10 and a corresponding connecting bar 311 of the other counterweight member 31 that is disposed on the other opposite side of the underwater pipe 10. The advantages of the first embodiment can be similarly achieved using the second embodiment.

A method for positioning a large-diameter underwater pipe on the bottom of the body of water includes the following steps:

Step 1: preparing the fixing members 12, the submersible unit 20 and the counterweight unit 30;

Step 2: disposing the fixing members 12 on the outer circumferential surface 11 of the underwater pipe 10 in a spaced apart manner along the length thereof and mounting the positioning frame 21 on one of the fixing members 12;

Step 3: emptying the receiving space 221 of each of the tank members 22 to float the underwater pipe 10 on a water surface and then dragging the underwater pipe 10 to a predetermined distance from the shore;

Step 4: operating the water inlet valve 223 and the air outlet valve 224 of each of the tank members 22 for water to fill the receiving space 221 of each of the tank members 22 for submerging the underwater pipe to the bottom of the body of water (e.g., a seabed or riverbed); and Step 5: securing the connecting bars 311 of the counterweight unit 30 to the corresponding fixing members 12 using the fasteners 32.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An apparatus for positioning an underwater pipe, the underwater pipe extending along a longitudinal axis and having an outer circumferential surface, said apparatus comprising:
    a plurality of fixing members configured to be disposed on the outer circumferential surface of the underwater pipe in a spaced apart manner along a length of the underwater pipe;
    a submersible unit including a positioning frame detachably mounted on one of said fixing members, and a plurality of tank members fixed to said positioning frame, each of said tank members having a tank body defining a receiving space, and a water inlet valve and an air outlet valve both operably mounted on said tank body; and
    a counterweight unit including at least one counterweight member and at least one connecting bar connected to said at least one counterweight member;
    wherein said receiving spaces of said tank members are empty prior to operation of said water inlet valves and said air outlet valves of said tank members so that said tank members have a buoyancy for floating the underwater pipe on a water surface, and are filled with water when said water inlet valves and said air outlet valves of said tank members are operated for submerging the underwater pipe;
    wherein said at least one connecting bar is connected to another one of said fixing members which is spaced apart from said one of said fixing members when the underwater pipe is submerged for positioning the underwater pipe on a bottom of a body of water; and
    wherein each of said fixing members is a ring configured to be sleeved on the outer circumferential surface and having a U-shaped cross section perpendicular to the longitudinal axis, each of said fixing members having an annular bight portion configured to abut against the outer circumferential surface, and two annular flanges extending respectively and transversely from two opposite ends of said annular bight portion away from the outer circumferential surface, said annular flanges of said one of said fixing members being provided for fixing connection with said positioning frame, said flanges of said another one of said fixing members being provided for fixing connection with said at least one connecting bar.

2. The apparatus as claimed in claim 1, wherein said annular flanges of each of said fixing members have a plurality of aligned fixing holes, said at least one connecting bar being formed with a plurality of through holes, said counterweight unit further including a plurality of fasteners each of which extends through one of the aligned said fixing holes and a corresponding one of said through holes to fix said least one connecting bar between said annular flanges of the other one of said fixing members.

3. The apparatus as claimed in claim 1, wherein said at least one connecting bar includes two said connecting bars connected to a same side of said counterweight member for simultaneous connection with two of said fixing members that are proximate to each other.

4. A method for positioning an underwater pipe on a bottom of a body of water, the underwater pipe extending along a longitudinal axis, said method comprising the steps of:
    (A) preparing a plurality of fixing members, a submersible unit and a counterweight unit, each of the fixing members being a ring and having a U-shaped cross section perpendicular to the longitudinal axis, the submersible unit including a positioning frame and a plurality of tank members fixed to the positioning frame, each of the tank members having a tank body defining a receiving space, a water inlet valve and an air outlet valve both operably mounted on the tank body, the counterweight unit including at least one counterweight member and at least one connecting bar connected to the at least one counterweight member;
    (B) sleeving the fixing members on an outer circumferential surface of the underwater pipe in a spaced apart manner along a length of the underwater pipe and connecting the positioning frame to one of the fixing members, each of the fixing members having an annular bight portion abutting against the outer circumferential surface, and two annular flanges extending respectively and transversely from two opposite ends of the annular bight portion away from the outer circumferential surface, the positioning frame being connected to the annular flanges of the one of the fixing members;
    (C) emptying the receiving space of each of the tank members to float the underwater pipe on a water surface and then dragging the underwater pipe to a predetermined distance from a shore;
    (D) operating the water inlet valve and the air outlet valve of each of the tank members for water to fill the receiving space of each of the tank members for submerging the underwater pipe; and
    (E) securing the at least one connecting bar of the counterweight unit to the annular flanges of another one of the fixing members.

5. An apparatus for positioning an underwater pipe, the underwater pipe extending along a longitudinal axis and having an outer circumferential surface, said apparatus comprising:

a plurality of fixing members configured to be disposed on the outer circumferential surface of the underwater pipe in a spaced apart manner along a length of the underwater pipe; a submersible unit including a positioning frame detachably mounted on one of said fixing members, and a plurality of tank members fixed to said positioning frame, each of said tank members having a tank body defining a receiving space, and a water inlet valve and an air outlet valve both operably mounted on said tank body; and a counterweight unit including at least one counterweight member and two connecting bars;

wherein said receiving spaces of said tank members are empty prior to operation of said water inlet valves and said air outlet valves of said tank members so that said tank members have a buoyancy for floating the underwater pipe on a water surface, and are filled with water when said water inlet valves and said air outlet valves of said tank members are operated for submerging the underwater pipe; and wherein said connecting bars are connected to a same side of said counterweight member for simultaneous connection with two of said fixing members that are proximate to each other and that are spaced apart from said one of said fixing members when the underwater pipe is submerged for positioning the underwater pipe on a bottom of a body of water.

\* \* \* \* \*